Aug. 18, 1959 K. C. ALLISON 2,900,461
ELECTRICAL SWITCHING UNITS
Filed June 1, 1955 2 Sheets-Sheet 1
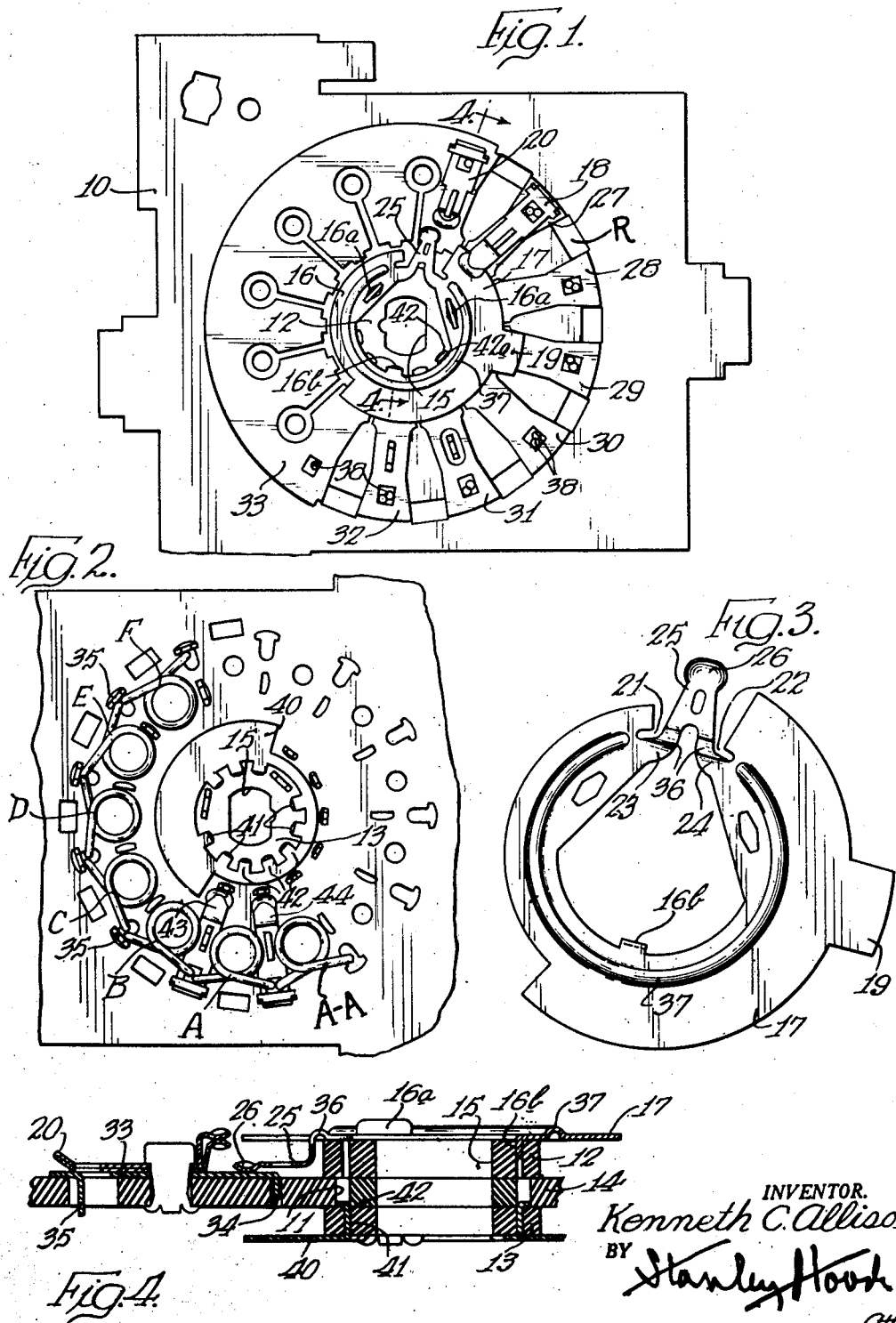
INVENTOR.
Kenneth C. Allison
BY Stanley Hoof
Atty.

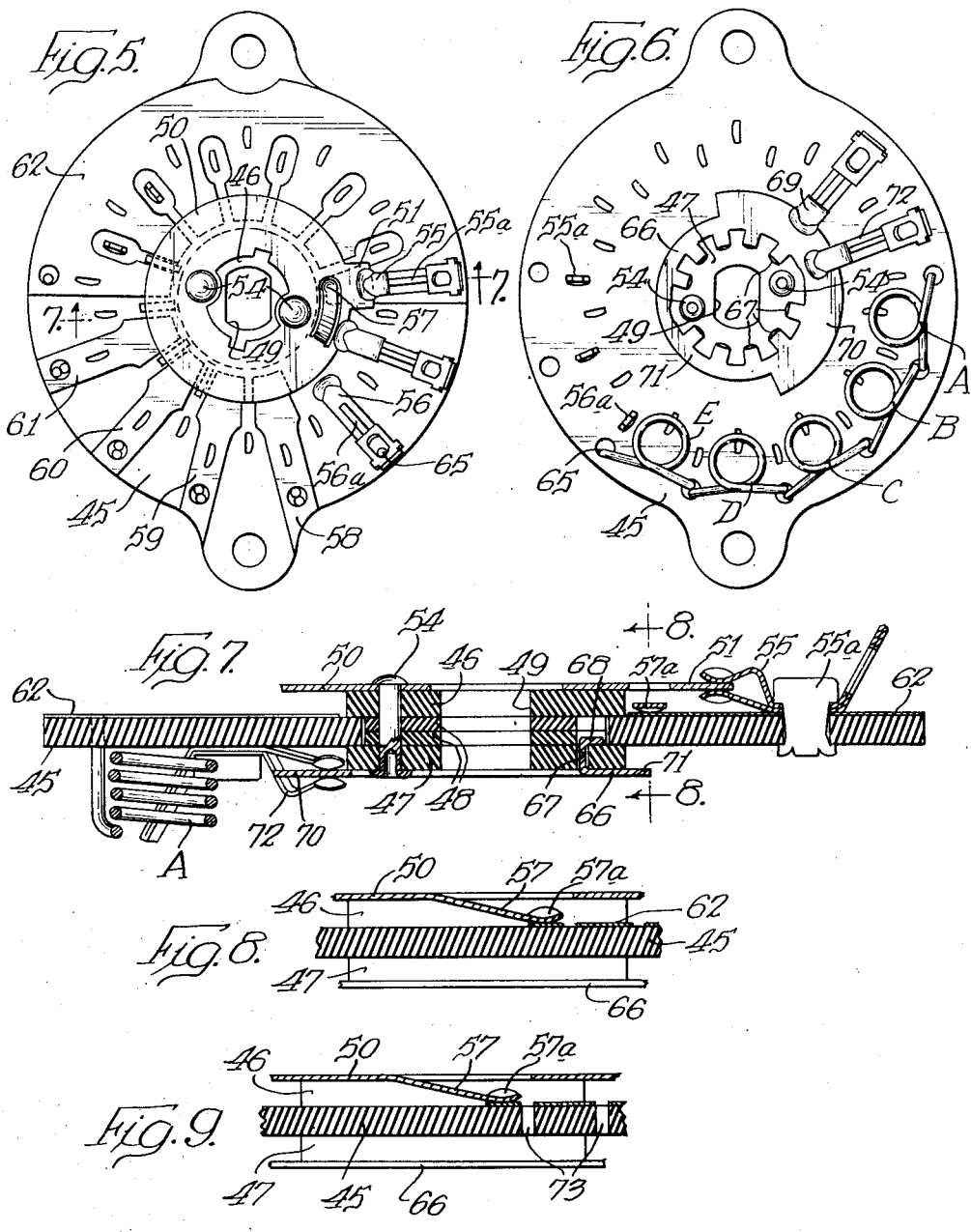

United States Patent Office 2,900,461
Patented Aug. 18, 1959

2,900,461

ELECTRICAL SWITCHING UNITS

Kenneth C. Allison, Crystal Lake, Ill.

Application June 1, 1955, Serial No. 512,517

7 Claims. (Cl. 200—11)

The present invention relates to rotary multi-circuit variety switches wherein a conductive rotor blade secured to a face of and having an edge portion extending beyond the periphery of an insulating rotor in spaced opposed relation to the surface of an insulating stator and resilient wiping contacts secured to and projecting from said surface of the stator selectively engage said edge portion of the rotor blade as the rotor is moved to a plurality of positions, such as in circuit selecting switches used in radio and television apparatus.

An object of this invention is to provide a rotary switch of this type having such improvements in design and construction as to make it extremely well suited for applications wherein the rotor blade is utilized for establishing electrical connection between the resilient wiping contacts and rigidly fixed contacts on the stator in the form of flat conductor segments which lie in a plane in axially offset parallel relation to the rotor blade edge portion engaged by the resilient wiping contacts as, for example, in switch type high frequency tuners having inductance segments mounted on the stator.

A rotary switch embodying the features of this invention accordingly includes a rotor blade having an extension in the form of a resilient finger which reaches and has direct wiping engagement with such conductor segments on the stator while also providing an edge portion for engagement by the resilient wiping contacts fixed to the stator.

It is contemplated by the present invention to adopt such a rotary switch construction for use with various types of installations. However, in the drawing and in the following description, the switch will be shown and described in connection with a switch type television tuner section wherein tuner inductance segments in the form of flat current conductors fixed to the stator have selective engagement with the rotor blade through the resilient finger which is carried by the rotor blade. It is readily apparent, of course, that various other applications could be mentioned with reference to the use of a switch embodying the features of this invention and that this invention, therefore, is not to be limited to the specific use hereinafter described and illustrated in the drawing.

Other and further objects and advantages of this invention will become more apparent by reference to the following description taken in connection with the accompanying drawing in which:

Fig. 1 is a view of one face of a television tuner switch section having a rotor blade embodying the features of this invention.

Fig. 2 is a fragmentary view of the opposite face of the switch section shown in Fig. 1.

Fig. 3 is an enlarged detail view of the rotor blade shown in Fig. 1.

Fig. 4 is a fragmentary enlarged section taken on line 4—4 of Fig. 1.

Fig. 5 is a view of one face of a rotary switch section having a rotor blade embodying the features of this invention and wherein the inductance segments on the stator and the cooperating resilient finger of the rotor blade present certain modifications in construction and assembly.

Fig. 6 is a view of the opposite face of the rotary switch section shown in Fig. 5.

Fig. 7 is an enlarged section taken on line 7—7 of Fig. 5.

Fig. 8 is an enlarged fragmentary section taken on line 8—8 of Fig. 7.

Fig. 9 is a view similar to Fig. 8 showing a stator of slightly modified construction.

In accordance with the rotary switch construction embodying the present invention as shown in Figs. 1 to 4 inclusive, numeral 10 designates a stator formed of a suitable rigid insulating material provided with a circular opening 11. Two rotors indicated as 12 and 13, respectively, and also formed of suitable insulating sheet material, are arranged one at each face or side of the stator 10. Each rotor is of such size relative to the circular opening in the stator as to overlap the face portions of the latter about said opening. A hub member 14 made up of one or more disks of insulating material sandwiched between the rotors 12 and 13 and to which the hub member 14 is rigidly joined presents a central opening in alignment with a similar opening in the rotors 12 and 13 to define a non-circular passageway 15 in which a switch operating shaft, not shown, is fitted for transmitting rotary motion from the shaft to the rotors. A conductor ring or blade 16 is secured to the rotor 12 by means of staking rivets 16$^a$ which pierce opposed inner marginal portions of the blade 16 and also project through the hub member 14 and the rotor 13 to establish rigid assembly of the rotors 12 and 13 and the hub member 14. The blade 16 presents a flat outer edge portion 17 which extends beyond the periphery of the rotor 12 for engagement with the flexible jaws or contact portion of a terminal 18 fixed to the stator 10. The blade 16 also has a wing 19 in radially outward extending relation to the edge portion 17 for engagement with the flexible jaws or contact portion of a terminal 20 also fixed to the stator 10.

As clearly shown in Fig. 1, the staking rivets 16$^a$ and a tongue 16$^b$ forming an extension of the inner margin of the blade 16 which is turned into a hole formed in the rotor 12 (see Fig. 4) are located at substantially uniform distances apart circumferentially of the blade 16. A section of the blade 16 located substantially diametrically opposite the tongue 16$^b$ is provided with a pair of slots 21 and 22 which extend inwardly from the outer edge portions of the rotor blade and each slot branches circumferentially away from the other slot at the inner limits thereof to define a relatively narrow strip at the inner edge of the rotor blade as at 23 and 24. The strips 23 and 24 thus formed by the inner end of the slots 21 and 22 provide a junction between the rotor blade 16 and a finger 25 extending radially outwardly from the blade 16. The finger 25 is divided along a central radial course at its inner end to define a pair of branches which diverge to form a continuation of the strips 23 and 24. As shown in Fig. 4, the finger 25 is offset axially in the direction of the stator so as to locate its free end in a position to have wiping engagement with current conductors mounted on the stator. As shown in Fig. 1, these conductors consist of tuner segments 27, 28, 29, 30, 31, 32 and 33, each of said segments being fastened to the stator 10 by means of integral tongues 34 and 35 secured in registering openings formed in the stator 10. In accordance with a preferred construction and assembly of such tuner segments, such segments constitute sections of a preformed circular metallic blank having web portions joining the segments along the periphery of the blank which are adapted to occupy positions opposite the rectangular shaped openings R arranged in the circle containing the openings receiving the tongues 35 whereby said web portions may be severed from the segments and pushed through the rectangular openings R under action of a suitable punching tool and the tongues 35 and 34 secured in the openings in the stator 10 in one operation.

The free end of the finger 25 is preferably dished to provide a convexly shaped contact surface 26 facing and having engagement with the conductors 27, 28, 29, 30, 31, 32 and 33 as the rotor is turned. The junction between the strips 23 and 24 and the finger 25 is also arched as at 36 whereby added flexibility of the finger 25 is provided in the direction of the conductors. To provide desired stiffness at the outer edge portions of the rotor blade 16, a bead 37 is formed therein between inner and outer edge portions of the blade.

The conductors 27, 28, 29, 30, 31, 32 and 33 have electrical connection with a series of coil type inductance elements A—A, A, B, C, D and E, arranged in an arc along the surface of the stator 10 opposite to the side thereof bearing the conductors, by means of legs 38 forming extensions of said coil elements which enter openings in the stator and have soldered fastening to said conductors as well as to stator contact terminals 18 and 20. A conductor ring or blade 40 secured to the rotor 13 by means of integral tongues 42 secured in openings 41 in the rotor 13 presents a flat outer edge portion extending beyond the periphery of the rotor for engagement with the flexible jaws or contact portions of terminals 43 and 44. As seen from Fig. 2, these terminals 43 and 44 are soldered respectively to the junction between inductance coils A and B and the junction between inductance coils A—A and A. An extension of one of the tongues 42 of the blade 40 has soldered connection to the rotor blade 16 as at 42ᵃ whereby the blade 40 and the rotor blade 16 are conductively joined. Through rotation of the rotors 12 and 13, the finger 25 through its contactor portion 26 is accordingly cooperating selectively with the conductors 27 to 33 inclusive to establish an electrical connection between the circuits controlled by the rotor blade 16 and the stator terminal contacts 18 and 20 as well as the circuits controlled by the rotor blade 40 and the cooperating stator terminal contacts 43 and 44 to regulate the inductance of said circuits under the control of the inductance elements.

In the modified switch construction shown in Figs. 5, 6, 7 and 8, an insulating stator 45 is provided with a central opening in which a pair of rotor disks of insulating material, designated by numerals 46 and 47 have rotatable mounting by means of a pair of spacers 48 forming a hub between said rotor disks 46 and 47. A conductor ring or blade having a flat rim portion 50 and a radially extending wing 51 is secured to the face of the rotor disk 46 by means of a pair of rivets 54 which also penetrate the hub 48 and the rotor disk 47 to secure the rotor disks and hub in rigid assembly. Axially aligned non-circular openings in the rotor disks and hub define a passage in which an operating shaft (not shown) is interfitted to provide for turning of the rotor disks under control of said shaft. The wing 51 of the rotor blade is engageable with the flexible jaws or contact portion of a terminal 55 fixed by a staking rivet 55ᵃ to the stator 45. The rim portion 50 of the rotor blade is engageable with the jaws or contact portion of a terminal 56 secured by a staking rivet 56ᵃ to the stator 45.

A strip of material sheared and bent from the rotor blade in radially inward relation to the rim portion 50 projects toward the stator 45 whereby a resilient contactor 57 is provided for engagement with a series of conductor segments 58, 59, 60 61 and 62 mounted on the surface of the stator 45 facing said contactor 57. The contactor 57 is provided with a spoon-shaped terminal with which the conductor segments have selective engagement as the rotor is turned.

The conductors 58, 59, 60, 61 and 62 preferably constitute conductive areas that are "printed" on the surface of the stator 45. By means of legs 65 which extend through openings in the stator and having soldered connection to the conductors, a series of coil type inductance elements A, B, C, D and E, arranged on the face of the stator 45 opposite to the face carrying the conductors, has electrical connection with said conductors. A conductor ring or blade 66 is secured to the rotor 47 by means of integral tongues 67 fastened in openings provided in the rotor. The flexible jaws or contact portions of a terminal 69 secured to the stator 45 has engagement with the outermost radially extending rim portion 70 of the rotor blade 66 while the rim portion 71 which is offset radially inwardly of the rim 70 is engageable with the jaws of a terminal 72 fixed to the stator.

Accordingly, as the rotors 46 and 47 are turned, the conductors 58, 59, 60, 61 and 62 selectively cooperate with the terminal 57ᵃ of the contactor 57 to establish a connection between the circuits controlled by the rotor blade rim portion 50 and wing 51 and the stator terminal contacts 43 and 44 as well as the circuits controlled by the rotor blade 66 and the stator contact terminals 69 and 72 fixed to the stator, to regulate the inductance of said circuits.

As shown in a modified form of the stator 45 in Fig. 9, the conductors 58 to 62 inclusive are separated by a slot 73 which functions to prevent fragments of the conductor areas from forming a bridge across the space between segments under the repeated wiping action of the contactor 57ᵃ.

An important advantage of a television tuner section of the construction and design described herein featuring electrical connection between the rotor blade and the inductance segments on the stator by direct engagement of such segments with a contactor forming an extension of the rotor blade is that the inductive response through a selected tuner segment is kept at a stable value at any position of the contactor on said segment between the radial slots or gaps which separates said segment from the segments on either side thereof. Thus, as distinguished from tuner sections which employ jaw type contacts fixed to the stator as a medium of electrical connection between the rotor blade and the inductance segments, the tuner constructions disclosed herein operate to minimize the shift in the inductive response of the inductances as the location of the contactor is varied within the dimensions of the inductance segment measured along the path of the contactor since the same inductance is maintained in either direction of rotation of the moving contactor.

In addition the extent of the portion of the rotor blade available for wiping engagement with stator contacts in a plane offset from the inductance segments through the axial clearance provided between said portion of the rotor blade and the inductance segments makes the switch forming the subject of this invention especially suitable for a variety of switching facilities in connection with its function as a television tuner section.

What is claimed is:

1. In a rotary switch assembly, a stator of insulating material having an opening, a rotor of insulating material having rotating support in said opening and overlying the margin of one surface of the stator around the opening, a conductor blade secured to the rotor having an outer edge portion extending beyond the periphery of the rotor in spaced opposed relation to said surface of the stator, resilient wiping contacts on the stator with which said outer edge portion of the conductor blade is engageable, and one or more other contacts on the stator presenting flat faces in a plane removed from the path of the aforesaid edge portion of the conductor blade, said conductor blade being slotted radially inwardly from said outer edge portion thereof to define a resilient finger forming an extension of the conductor blade which has wiping engagement with the latter stator contacts.

2. In a rotary switch assembly as defined in claim 1 wherein the resilient finger is divided to define a pair of branches which diverge in the direction of the rotor conductor blade.

3. In a rotary switch assembly as defined in claim 1 wherein the outer end of the resilient finger presents a convexly domed surface facing the flat stator contacts.

4. In a rotary switch assembly as defined in claim 1 wherein the resilient finger joins the rotor conductor blade by means of a pair of branches which diverge in the direction of the rotor conductor blade and each of said branches is arched in a direction away from the stator contacts engaged by said finger and around an axis extending circumferentially of the rotor.

5. In a rotary switch assembly as defined in claim 1 wherein the stator contacts engaged by the resilient finger are fastened to the stator by means of integral tongues secured in registering openings formed in the stator.

6. In a rotary switch section as defined in claim 1 wherein the stator contacts engaged by the resilient finger consist of tuner segments.

7. In a rotary switch assembly as defined in claim 1 wherein the resilient wiping contacts on the stator constitute jaws of terminals fixed to the stator.

References Cited in the file of this patent

UNITED STATES PATENTS

| | | |
|---|---|---|
| 2,177,481 | Hall | Oct. 24, 1939 |
| 2,292,717 | Rubinstein | Aug. 11, 1942 |
| 2,497,747 | Valdettaro | Feb. 14, 1950 |
| 2,557,234 | Rieth | June 19, 1951 |
| 2,584,176 | Wingert | Feb. 5, 1952 |
| 2,631,211 | Klay | Mar. 10, 1953 |
| 2,650,960 | Allison | Sept. 1, 1953 |
| 2,682,643 | Thias | June 29, 1954 |

FOREIGN PATENTS

| | | |
|---|---|---|
| 501,556 | Great Britain | Mar. 1, 1939 |
| 676,343 | Great Britain | July 23, 1952 |